Patented Feb. 7, 1933

1,896,644

UNITED STATES PATENT OFFICE

ARNOLD PFAU, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

HYDRAULIC TURBINE

Application filed October 4, 1930. Serial No. 486,337.

This invention relates in general to the art of hydraulic engines and relates more specifically to improvements in the construction and operation of hydraulic turbines.

An object of the invention is to provide a medium-head high speed hydraulic turbine in which the cavitation or pitting of the runner is reduced to a minimum. Another object of the invention is to provide a medium-head hydraulic turbine that is capable of operating at higher speeds than are the turbines of the prior art operating under like heads. Another object of the invention is to provide a hydraulic turbine with a unitary two-stage series runner having means for adjusting the angularity of the vanes of one of the vane sections thereof whereby higher efficiencies at partial loads are attainable. Another object of the invention is to provide a hydraulic turbine with a two-stage series runner between the vane sections of which an annular space exists which serves to lessen the danger of cavitation at part loads and also decreases the effect of the whirl component of the streams of water discharged from the first vane section on the other or axial vane section with increase of speed of the turbine and thereby realizing greater flexibility as regards efficiency when operating under variable speed.

Other objects and advantages of the present invention will become apparent from a reading of the specification and of the drawing forming a part thereof and on which like reference characters are used to designate the same parts in the various views.

Figure 1:
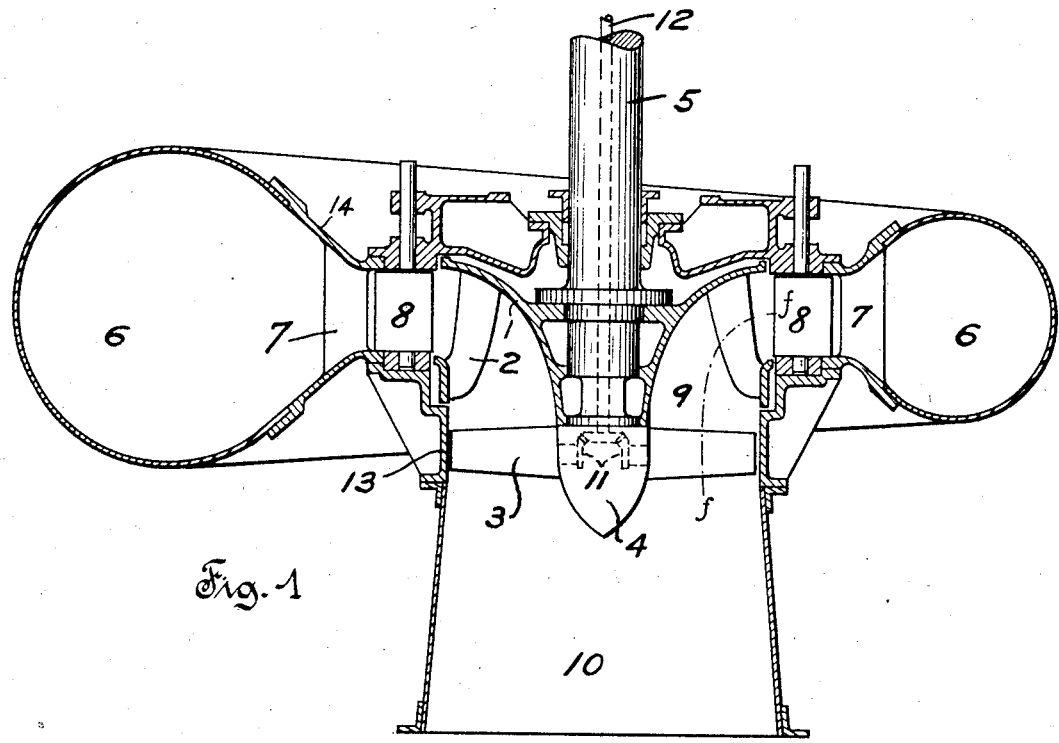
Fig. 1 is a central vertical sectional view of a radial flow inlet-axial flow outlet hydraulic turbine constructed according to this invention.

There are two main factors to be considered in the development of medium heads, of say between 50 to 150 feet. The first is speed, it being desirable to realize as high a speed as possible in order to keep the cost of the power transforming machine such as a generator driven by a hydraulic turbine down to a minimum. If a Francis turbine were used to absorb such a head completely and in one stage a maximum speed could not be attained. In this type of turbine it is quite frequently necessary to provide unfavorable curvatures of runner vanes in order to avoid excessive length of vanes along the flow lines in the runner and in order to extract all the kinetic energy represented by the head. Now, high speeds together with unfavorable runner vane curvatures greatly increases the amount of pitting of the runner. Eliminating the unfavorable runner vane curvatures while maintaining high speeds would reduce the amount of pitting of the runner. The first of these factors is realized according to this invention by using a vane section having vanes of the Francis runner type that is not capable of extracting the full amount of kinetic energy stored in a medium head of water and the individual vanes of which therefore have more favorable curvatures. By combining such a vane section with another annular series or section of vanes constituting by themselves a propeller and spacing it from the former vane section to form a two-stage runner, a higher speed is attained from the medium head than would be possible if a single runner of the Francis type were used to extract all the head in one stage. And thus also the second of the above named factors is realized.

The water discharges from the Francis vane section at a much higher absolute velocity and is not turned around as far as would have to be the case if a single Francis runner were used alone. Since the water is not fully turned around, it flows with a pronounced forward whirl into the space between the two vane sections. This forward component and the high velocity of water in this space acts similar to what exists in the space between a guide casing and a propeller type of runner used as such at present. When the speed varies the whirl component varies and to some extent also the absolute velocity, but it will be shown later by a velocity of flow diagram, that any change of speed does not affect this condition as seriously as in the case of a runner of the Francis type using up all of the head. Consequently, this composite two-stage series runner will have a greater flexibility as regards efficiency under variable speed.

In order to realize higher part-gate efficiencies, the propeller forming vane section is provided with adjustable vanes, which permits of adjusting the effective vane areas more in conformity with the amount of water received from the Francis vane section and also in conformity with the increased whirl. Reducing the propeller area, produces a certain back pressure on the discharge ends of the vanes of the Francis vane section, and thereby pitting of the runner by cavitation is further lessened to an amount much below what is experienced where a Francis runner designed to use up all the head is operated at part gate.

Having now described the principle of this invention a structure whereby it is contemplated applying this principle will now be described in detail.

Figure 2:
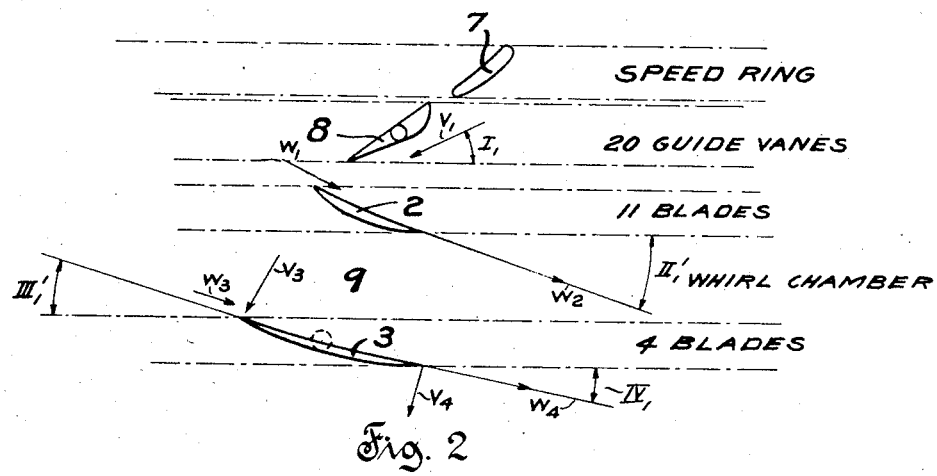
Fig. 2 is a development of the guide vanes and vanes of the vane sections of the composite runner along the flow line $f$—$f$ of Fig. 1.
Figure 3:
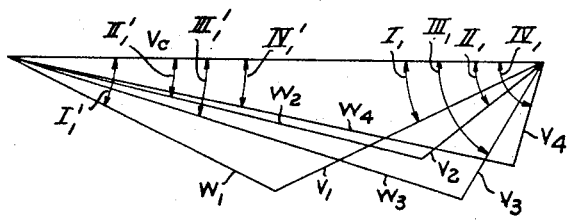
Fig. 3 is a victor diagram of the velocities of flow along line $f$—$f$ of Fig. 1.

Referring to Fig. 1 of the drawing reference numeral 1 represents the crown of a composite runner constructed according to this invention and 4 a hub extension thereof. The crown 1 and hub 4 are fixedly secured to a hollow shaft 5 mounted for rotation centrally within a casing 13 in a well known manner. An annular series of Francis type or mixed flow type of vanes 2 depends from the upper part of crown 1 while an annular series of vanes 3 of the propeller type is adjustably secured to hub 4. The usual casing 6 having a speed ring 14 provided with stationary vanes 7 surrounds the casing 13 and forms the means for admitting water to the vanes 2 which admission is controlled by a plurality of pivotally mounted guide vanes 8 of ordinary construction and operation. The vanes 3 of the propeller type are individually rotatably mounted in radial directions in the hub 4 and are simultaneously angularly adjustable through an adjusting means consisting of gearing 11 and shaft 12 operatively received within the hollow shaft 5. The vanes 3 are preferably automatically adjusted in accordance with the degree of opening of the guide vanes 8 by any suitable means not shown. The casing 13 is illustrated as extending to a level corresponding to the lower edge of the vanes 3. And connected to this end of the casing 13 is a draft tube 10 which increases in diameter downwardly from said connecting upper end. A flow line $f$—$f$ is indicated in Fig. 1 and in connection with this line, Figs. 2 and 3 are to be read. The equalizer space 9 between the two sections or series of vanes 2 and 3 acts as an accelerator to increase the velocity between the outlet from vanes 2 and the inlet to vanes 3.

Now referring to Fig. 2 in which the horizontal dot-dash lines represent tangent lines as if drawn at the inlet and outlet edges of the guide vanes 7 and 8 and runner vanes 2 and 3 at the points of intersection of the flow line $f$—$f$.

Now arrow $V_1$ in Fig. 2 and corresponding vector $V_1$ in Fig. 3, represents the absolute velocity in the guide casing at the exit edge of a guide vane 8 making an angle $I_1$ with a velocity vector $V_c$ the horizontal datum line of Fig. 3 which represents the common speed of the two vane sections comprising vanes 2 and 3 of the composite runner. Absolute velocity $V_1$ forms a relative entrance velocity to the vane 2 indicated by arrow $W_1$ of Fig. 2 and corresponding vector $W_1$ of Fig. 3 making an angle $I_1^1$ with vector $V_c$. This is turned around in vane 2 to a direction indicated by arrow $W_2$ of Fig. 2 and corresponding vector $W_2$ of Fig. 3 making an angle $II_1^1$ with vector $V_c$ and resulting in absolute velocity $V_2$, indicated by the arrow $V_2$ of Fig. 3 making an angle $(II_1)$, at the outlet of vane 2 and also being the absolute entrance velocity into the equalizer space or whirl chamber 9.

Since the water leaving the vanes 2 must be accelerated in whirl chamber 9 for the reason that the conduit area immediately above the vanes 3 is smaller than the area of the conduit portion immediately adjoining the outlets of vanes 2, it follows that the absolute velocity $V_2$ must increase to a value $V_3$ indicated by the arrow in Fig. 2 and the corresponding vector $V_3$ in Fig. 3 making an angle $(III_1)$, immediately above the vane 3. This forms a relative entrance velocity $W_3$ to the vane 3 indicated by the arrow in Fig. 2 and by the corresponding vector $W_3$ in Fig. 3 making an angle $III_1^1$. In the vane 3 the water is turned around from the relative velocity value $W_3$ to a relative velocity $W_4$ making an angle $IV_1^1$ and resulting in an absolute velocity from the vane 3 of $V_4$ making an angle $IV_1$ with vector $V_c$.

The large relative velocity angle corresponding to the angle $I_1'$, when a single stage Francis runner is used tends to make the $V_c$ line or speed line of such a turbine shorter than the $V_c$ line for this composite runner turbine shown in the diagram of Fig. 3. By carrying the analogy further it will be found that the smaller relative velocity exit angle corresponding to the angle $II_1'$ as compared with angle $11_1^1$ for this composite runner, results in a lower absolute velocity for such a single runner than is the corresponding velocity $V_4$ of this composite runner. The velocity flow vector diagram for a single runner using up all the head would be substantially evidenced by the velocity diagram as shown in Fig. 3 for vane 2 plus the velocity diagram for vane 3.

The hydraulic turbine above described is especially well adapted for transforming the energy of medium heads of water. And because of the composite runner with the equalizer space between the sections of runner vanes thereof high efficiencies at variable speeds are possible. The adjustable feature of the vanes 3 permits of a back pressure to exist on the vanes 2 which lessens the danger of runner pitting at part loads and also permits the area of the vanes 3 presented to the second series water head or the head from vanes 2 to be made to conform to the flow to vanes 3 a feature which is conducive of higher efficiencies at part gate opening operations of the turbine. The composite runner attains a higher speed than if a single Francis runner were used, cutting down the cost of a generator to be driven thereby and also permits of the use of a draft tube having a reduced diameter at the throat.

While the composite runner shown on the drawing is illustrated as having twenty guide vanes, eleven vanes of the Francis type and four vanes of the propeller type it is to be understood that this is merely illustrative of a possible design of a hydraulic turbine according to this invention and not as limiting the invention. And the vanes 3 may be made to coincide with vanes 2 or to be staggered in relation to vanes 2 as may be found desirable.

It is to be understood that it is not intended to limit this invention to the details of construction shown and described, for various modifications within the scope of the claims may occur to persons skilled in the art.

It is claimed and desired to secure by Letters Patent:

1. In combination, a casing having an annular side inlet, a conduit forming with said casing an axial flow passage, a runner rotatably mounted within said casing and having a vane section adjacent said inlet and an axial flow type of vane section in said flow passage, said sections being separated by an annular free space concentric with the axis of the runner, and means for conducting a hydraulic fluid to said inlet.

2. In combination, a casing having an annular side inlet, a conduit forming with said casing an axial flow passage, a runner within said casing and centrally rotatable therein, said runner having a vane section adjacent said inlet and a propeller vane section in said flow passage, said vane sections being separated by an annular free space concentric with the axis of the runner, and means for conducting a hydraulic fluid to said inlet.

3. In combination, a casing having an annular side inlet, a conduit forming with said casing an axial flow passage, a runner within said casing and centrally rotatable therein, said runner having a vane section adjacent said inlet and another vane section in said flow passage, the vanes of one of said sections being angularly adjustable, and said vane sections being separated by an annular free space concentric with the axis of the runner, and means for conducting a hydraulic fluid to said inlet.

4. In combination, a casing having an annular side inlet, a conduit forming with said casing an axial flow passage, a runner within said casing and centrally rotatable therein, said runner having a vane section adjacent said inlet and another vane section in said flow passage, the vanes of said latter vane section being angularly adjustable, and said vane sections being separated by an annular free space concentric with the axis of the runner, and means for conducting a hydraulic fluid to said inlet.

5. In combination, a casing having an annular side inlet, a conduit forming with said casing an axial flow passage, a runner within said casing and centrally rotatable therein, said runner having a vane section adjacent said inlet and another vane section in said flow passage, the vanes of said latter vane section being angularly adjustable, and said vane sections being separated by an annular free space concentric with the axis of the runner, and means for conducting a hydraulic fluid to said inlet.

6. In combination, a casing having an annular side inlet, a conduit forming with said casing an axial flow passage, a runner within said casing and centrally rotatable therein, said runner having a vane section adjacent said inlet and another vane section in said flow passage, the vanes of said latter vane section being angularly adjustable, and said vane sections being separated by an annular free space concentric with the axis of the runner, and means for conducting a hydraulic fluid to said inlet, and means for guiding and regulating the fluid flow through said inlet.

7. In combination, a casing having an annular side inlet, a conduit forming with said casing an axial flow passage, a runner within said casing and centrally rotatable therein, said runner having a vane section adjacent said inlet and another vane section in said flow passage, the vanes of said latter section being adjustable, and said vane sections being separated by an annular free space concentric with the axis of the runner, means for conducting a hydraulic fluid to said inlet, means for guiding and regulating the fluid flow through said inlet and said conduit having a reduced throat.

8. In combination, a casing having an annular side inlet and an end outlet, a runner within said casing and centrally rotatable therein, said runner having a vane section comprising a plurality of mixed flow type of vanes adjacent said inlet and another vane section comprising a plurality of propeller type of vanes adjacent said outlet, said vane sections being separated by an annular free space, and means for conducting a hydraulic fluid to said inlet.

9. In combination, a casing having an annular side inlet and an end outlet, a runner within said casing and centrally rotatable therein, said runner having a vane section comprising a plurality of mixed flow type of vanes adjacent said inlet and another vane section comprising a plurality of propeller type of vanes adjacent said outlet, said latter vanes being angularly adjustable, and said vane sections being separated by an annular free space, and means for conducting a hydraulic fluid to said inlet.

10. In combination, a casing having an annular side inlet and an end outlet, a runner within said casing and centrally rotatable therein, said runner having a vane section comprising a plurality of mixed flow type of vanes adjacent said inlet and another vane section comprising a plurality of propeller type of vanes adjacent said outlet, said latter vanes being angularly adjustable, and said vane sections being separated by an annular free space, means for conducting a hydraulic fluid to said inlet and an annular series of guide vanes for guiding and regulating the fluid flow through said inlet.

11. In combination, a casing having an annular side inlet and an end outlet, a runner within said casing and centrally rotatable therein, said runner having a vane section comprising a plurality of mixed flow type of vanes adjacent said inlet and another vane section comprising a plurality of propeller type of vanes adjacent said outlet, said latter vanes being angularly adjustable, and said vane sections being separated by an annular free space, means for conducting a hydraulic fluid to said inlet, an annular series of guide vanes for guiding and regulating the fluid flow through said inlet and a conduit having a reduced throat secured to the outlet end of said casing.

12. A turbine runner comprising a crown terminating in a hub portion, a plurality of fixed vanes depending from said crown and a plurality of propeller type of vanes operatively secured to said hub portion so as to be each angularly adjustable, and separated from said fixed vanes by an annular free space concentric with the axis of the runner.

In testimony whereof, the signature of the inventor is affixed hereto.

ARNOLD PFAU.

CERTIFICATE OF CORRECTION.

Patent No. 1,896,644.                                      February 7, 1933.

ARNOLD PFAU.

It is hereby certified that error appears in the printed specification of the above numbered patent requiring correction as follows: Page 3, line 118, claim 7, for "pasage" read "passage", and line 119, before "adjustable" insert the word "angularly"; and that the said Letters Patent should be read with these corrections therein that the same may conform to the record of the case in the Patent Office.

Signed and sealed this 28th day of March, A. D. 1933.

(Seal)                                         M. J. Moore.
                                              Acting Commissioner of Patents.